May 24, 1932.   H. MARCIN   1,860,109
AUTOMATIC ELECTRIC HAND SIGNAL
Filed Sept. 13, 1927   2 Sheets-Sheet 2
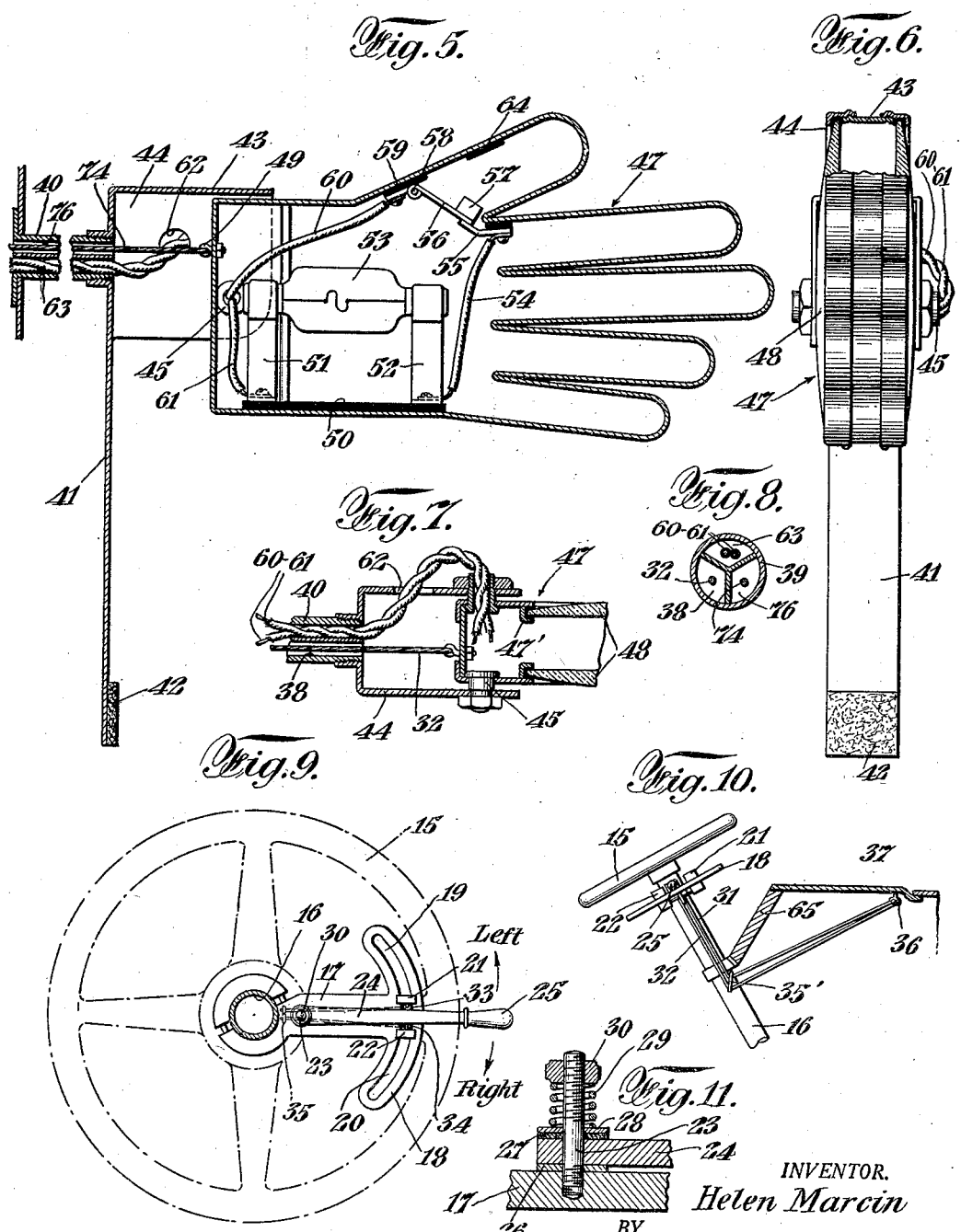

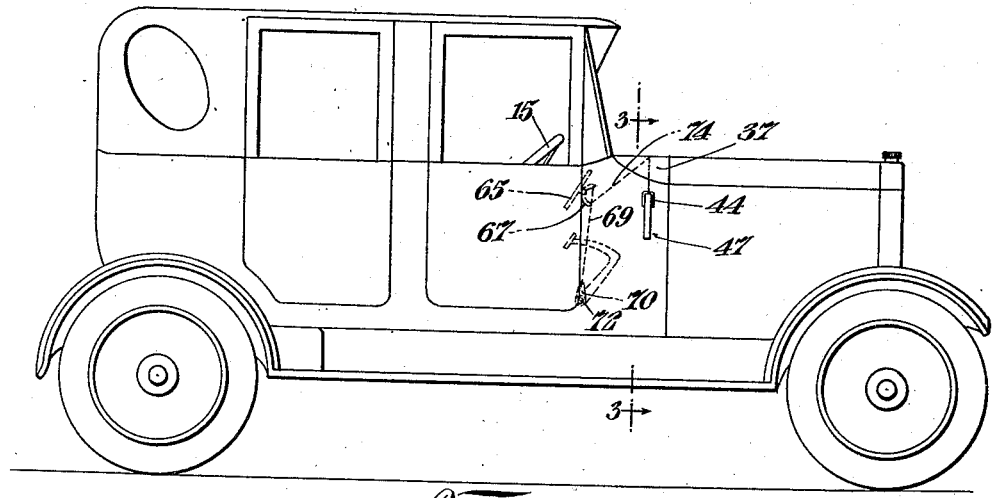
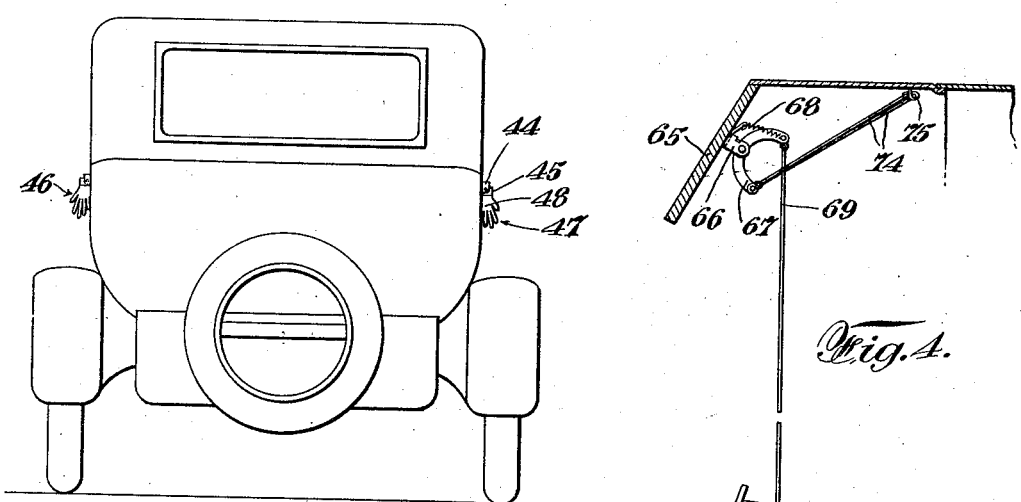
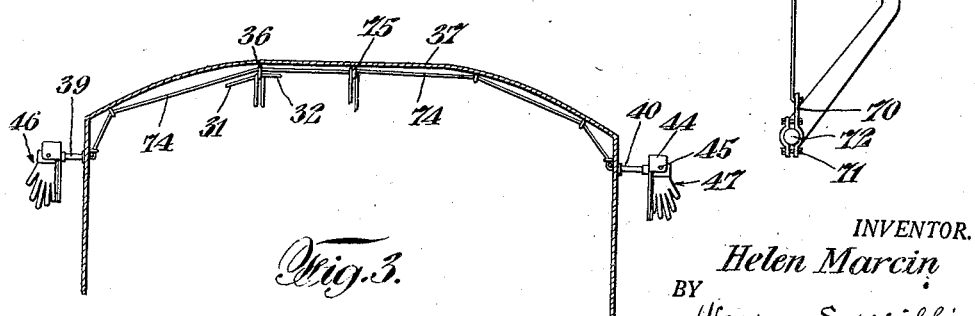

Patented May 24, 1932

1,860,109

UNITED STATES PATENT OFFICE

HELEN MARCIN, OF NEW YORK, N. Y.

AUTOMATIC ELECTRIC HAND SIGNAL

Application filed September 13, 1927. Serial No. 219,211.

This invention relates to hand-actuated, electrically illuminated vehicle signals by which an operator is enabled to indicate the direction in which it is proposed to turn the vehicle.

The present hazardous and disagreeable practice of signalling by extending the hand is regarded absurd and as inefficient for the reason that the operator must release one hand from the steering gear of the vehicle, and for the further reason that a person's hand extended in the dark cannot readily be seen, particularly if it is some distance from traffic in the rear or in the front.

A further objection lies in the fact that at the present condition of traffic congestion, which is at a point where a proper left and right hand side signal is necessary, it is disagreeable to open a window in cold weather in order to extend one's hand and also in inclement and stormy weather.

It is therefore, one of the objects of the present invention to provide a signal which may be extended at will, from either side of the vehicle, without discomfort on the part of the operator and which will show the proposed turning direction of the operator.

A further feature is in the provision of means for illuminating the signal, the signal being made in representation of a hand and so secured to the side of the vehicle as to be inconspicuous when not extended.

The invention further resides in the novel design, construction, and combination of parts as hereinafter described and illustrated in the accompanying drawings, forming a material part of this disclosure, and in which:

Figure 1 is a side elevational view of a conventional type of automobile, illustrating an application of the invention.

Figure 2 is a rear elevational view of the same.

Figure 3 is a transverse sectional view taken on line 3—3 of Figure 1.

Figure 4 is a side view of the stop device as arranged for foot control.

Figure 5 is a plan view of the signal, the cover being removed and the electrical connections shown therein.

Figure 6 is an end elevational view of the same.

Figure 7 is an enlarged fragmentary sectional view of the electrical connections and pivotal signal support.

Figure 8 is a transverse sectional view of the supporting means.

Figure 9 is a partial diagrammatical, partial sectional view illustrating the manual means for controlling the direction signal.

Figure 10 is a view indicating the connection of the control means to the steering member of the vehicle.

Figure 11 is a fragmentary sectional view showing the adjustable friction clamp by which the direction signal is held in an adjusted position.

Referring in greater detail to the drawings, the numeral 15 designates generally a steering wheel of a vehicle of the automobile type, the same being mounted on a post 16, usually of tubular cross-section.

Clamped to the post 16 below the steering wheel and extending toward the outer periphery thereof, is a bar 17 provided at its outer extremity with an arcuate cross-piece 18 having a pair of slots 19 and 20, in which are slidable blocks 21 and 22 extending above and below the element 18.

Threaded into the member 17 is a pivot rod 23 on which is rotatably mounted an arm 24 extending intermediate the blocks 21 and 22 and having a handle 25 on its outer end beyond the wheel 15, there being a metal washer 26 intermediate the arm 24 and bar 17 and a leather washer 27 above the arm, held in place by another washer 28 pressed downwardly by a coil spring 29 abutting a nut 30 on the upper end of the rod 23.

A pair of cords 31 and 32 are respectively secured at their ends to the blocks 21 and 22, below the member 18, from where they pass through a pair of loop eyes 33 and 34 and are then directed inwardly toward the post 16 where they pass through a double loop eye 35, following the post downwardly through a similar loop eye 35'.

The cords then pass through another double guide 36 fixed to the underside of the hood 37 of the vehicle, from which point they part, to the left and right respectively, to extend transversely across the hood, entering compartments 38 formed in a pair of tubes 39 and 40 extending outwardly from the sides of the vehicle body and the ends of which terminate in depending flat strips 41 provided with pads 42 at their lower extremities, covers 43 at the top, and partial side walls 44.

The walls 44 are provided with hollow pivots 45 on which are rotatably mounted, intermediate the walls, a pair of casings 46 and 47, left and right respectively, the casings being in the form of a hand and having frame members 47' receptive of colored convex glasses 48 on both sides of the hand, the cords 31 and 32 being fixed to the inner ends of the hand casings at 49, above the pivot point.

Fixed to the lower walls of the hands are insulating bars 50 from which extend a pair of support contacts 51 and 52 in which are mounted colored electric bulbs 53, the contacts 52 being connected by wires 54 to a strip contact 55 fixed at the base of the first finger and disposed in the path of the thumb, the same being engageable, when the hand is in operative position, with contact strips 56 carrying weights 57 on their outer ends and being pivoted at 58 to insulators 59 secured to the thumb, the last mentioned contacts and the contacts 51 being connected by wires 60 and 61, respectively passing through one of the hollow pivots 45 back intermediate the walls 44 through an opening 62, and through a second compartment 63 in the tubes 39—40 to a source of current supply.

When the hands are in downward positions, resting on the pads 42, the contacts 56 will rest against the inside of the thumbs and to prevent short circuits; the points at which they rest are provided with insulators 64.

Thus, if the driver of the vehicle intends to turn to the right or the left, the arm 24 is moved in one of the directions indicated in Figure 9 so as to slide either of the blocks 21 or 22. Such movement will obviously pull on the cords 31 or 32 to extend the hands at an angle of 45 degrees to indicate a left or right turn, such movement causing the contacts 56 to engage the contact 55, closing the electrical circuit to illuminate the bulb 53 of the extended hand.

Secured on the underside of the dashboard 65 is a pair of lugs 66 in which is pivotally mounted a semi-circular lever 67, its upper end being normally urged toward the dashboard by the action of a coil spring 68.

Fixed to the upper part of the bar 67 is one end of a cord 69, the opposite extremity of which is fixed to a lug 70 formed on a clamp 71 engageable on the pivot bar 72 of the clutch pedal 73, and fixed to the opposite end of the bar 67 is a pair of cords 74 passing through a double loop eye 75 on the undersurface of the hood 37 of the vehicle, from which point the cords extend in a similar manner to the cords 31 and 32 and pass through a third compartment 76 in the tubes 39 and 40 to be fixed to the inner end of each of the hands 46 and 47.

It will be thus seen that by depressing the clutch pedal 73, the upper end of the bar 67 will be pulled downwardly, which motion, through the cords 74, will cause the hands 46 and 47 to be simultaneously extended outwardly at an angle of 90 degrees to the body of the car, indicating a stop.

Such movement of the hands also actuates the weight controlled switches to illuminate the bulbs 53.

Thus it will be seen that by the use of a signal device as described, it will be unnecessary to extend the driver's hand outside of the car to indicate a stop or a turn, eliminating the disadvantages above stated.

Although I have described my improvements with considerable detail and with respect to certain particular forms of my invention, I do not desire to be limited to such details since many changes and modifications may well be made without departing from the spirit and scope of my invention in its broadest aspect.

Having thus described my invention, what I claim as absolutely new and desire to secure by Letters Patent, is:—

1. A directional signal device for motor vehicles, comprising a guide bar for attachment on the steering post of a vehicle and having a slot, a block slidably mounted in the slot, a signal mounted on the vehicle, said signal having the appearance of a human hand, a flexible connection between said signal and said block for raising the signal upon moving said block in one direction, a handle pivotally mounted on said guide bar and extending adjacent said block to move the block for raising said signal, and means for adjusting the friction at the pivot of said handle for causing the handle to hold the block in any position in the slot so that the signal is maintained in fully or partially raised positions or for causing the handle to move as directed by the block under the influence of the signal seeking its normal downward position.

2. A directional signal device for motor vehicles, comprising a guide bar for attachment on the steering post of a vehicle and having a slot, a block slidably mounted in the slot, a hand shaped signal mounted on the vehicle, a flexible connection between said signal and said block for raising the signal upon moving said block in one direction, a handle pivotally mounted on said guide bar and extending adjacent said block to move the block for raising said signal, means for adjusting the friction at the pivot of said handle for causing the handle to hold the block in any position in the slot so that the signal is maintained in fully or partially raised positions or for causing the handle to move as directed by the block under the influence of the signal seeking its normal downward position, comprising a pivot rod projecting from said guide bar through said handle constituting the pivotal mounting of the handle, a friction washer on said rod and against said handle, and means for urging said friction washer under adjustable pressures against said handle.

3. A directional signal device for motor vehicles, comprising a guide bar for attachment on the steering post of a vehicle and having a slot, a block slidably mounted in the slot, a signal mounted on the vehicle, a flexible connection between said signal and said block for raising the signal upon moving said block in one direction, a handle pivotally mounted on said guide bar and extending adjacent said block to move the block for raising said signal, means for adjusting the friction at the pivot of said handle for causing the handle to hold the block in any position in the slot so that the signal is maintained in fully or partially raised positions or for causing the handle to move as directed by the block under the influence of the signal seeking its normal downward position, comprising a pivot rod projecting from said guide bar through said handle constituting the pivotal mounting of the handle, a friction washer on said rod and against said handle, means for urging said friction washer under adjustable pressures against said handle, comprising a coaxial spring on said pivot rod acting against said friction washer, and a nut threaded on said pivot rod and acting against said spring.

In testimony whereof I affix my signature.

HELEN MARCIN.